United States Patent

Kikuchi

[11] Patent Number: 5,991,316
[45] Date of Patent: Nov. 23, 1999

[54] LASER LIGHT EMITTING DEVICE, LASER BEACON DEVICE AND LASER IMAGER DISPLAY DEVICE

[75] Inventor: Hiroki Kikuchi, Tokyo, Japan

[73] Assignee: Sony Corporation, Tokyo, Japan

[21] Appl. No.: 09/184,555

[22] Filed: Nov. 2, 1998

Related U.S. Application Data

[63] Continuation of application No. 08/698,739, Aug. 16, 1996, Pat. No. 5,832,009.

[30] Foreign Application Priority Data

Aug. 18, 1995 [JP] Japan ................................. 7-210669

[51] Int. Cl.[6] ................................. H01S 3/10; G02F 1/35
[52] U.S. Cl. ................................. 372/21; 372/10; 372/22; 372/23; 372/26; 372/28; 372/12; 359/326
[58] Field of Search ................................. 372/21, 22, 23, 372/28, 38, 43, 50, 109, 10, 26, 12; 359/326, 328

[56] References Cited

U.S. PATENT DOCUMENTS

| | | | |
|---|---|---|---|
| 4,866,720 | 9/1989 | Holly | 372/23 |
| 5,144,630 | 9/1992 | Lin | 372/22 |
| 5,253,258 | 10/1993 | Lawandy | 372/22 |
| 5,274,651 | 12/1993 | Urakami | 372/21 |
| 5,339,324 | 8/1994 | Eguchi et al. | 372/98 |
| 5,367,531 | 11/1994 | Eguchi et al. | 372/98 |
| 5,499,256 | 3/1996 | Bischel et al. | 372/28 |
| 5,513,196 | 4/1996 | Bischel et al. | 372/22 |
| 5,552,926 | 9/1996 | Owa et al. | 339/326 |
| 5,594,745 | 1/1997 | Oka | 372/21 |
| 5,621,744 | 4/1997 | Kikuchi et al. | 372/12 |
| 5,640,405 | 6/1997 | Wallace et al. | 372/21 |
| 5,740,190 | 4/1998 | Moulton | 372/23 |
| 5,751,758 | 5/1998 | Kuwatsuka | 372/96 |
| 5,832,009 | 11/1998 | Kikuchi | 372/21 |
| 5,862,163 | 1/1999 | Umezu et al. | 372/21 |

*Primary Examiner*—Brian Healy
*Attorney, Agent, or Firm*—Hill & Simpson

[57] ABSTRACT

A laser beam generating device which, by addition of a simplified structure, can enlarge the spectral width of the laser light and lower the coherence to a moderate value. The laser light generating device includes a first laser light source 31, a second laser light source 32, phase modulation units 34, 35 for phase-modulating the beams from the light sources with a sole frequency component or plural frequency components, and an additive frequency generating unit 33 for producing a light beam of the shorter wavelength based on the wavelength of the light phase-modulated by the phase modulation units 34, 30. The fundamental wavelength laser light generated by the first laser light source 31 is phase-modulated by the phase modulation unit 34 based on a pre-set modulation amplitude and the modulation frequency so as to be enlarged in spectral width before being incident on the additive frequency generating unit 33. The additive frequency generating unit 33 generates an additive frequency based on the laser light beams from the light sources for conversion to short wavelengths and for enlarging the spectral width. The result is that the distance of coherence of the outgoing laser light is shortened for removing the speckle noise.

10 Claims, 9 Drawing Sheets

LASER LIGHT EMITTING DEVICE, LASER BEACON DEVICE AND LASER IMAGER DISPLAY DEVICE

This application is a continuation of application Ser. No. 08/698,739 filed Aug. 16, 1996, now U.S. Pat. No. 5,832,009.

BACKGROUND OF THE INVENTION

Field of the Invention

This invention relates to a laser light emitting device operating as a light source for the laser light which for which a moderately wide spectral width is required.

Heretofore, attempts have been made for utilizing a high output laser in a variety of industrial fields by exploiting monochromaticity (narrow spectral band) of the laser light. In particular, the laser light excited by a laser light source employing neodymium aluminum garnet (Nd:YAG) oscillating at a longitudinal single mode by a Q-switching method, referred to hereinafter simply as a Nd:YAG switch laser, and the laser light obtained on wavelength conversion of this laser light, exhibit high peak intensity, so that such laser light is expected to be used in a number of industrial fields.

Such Q-switch laser oscillates in general in longitudinal multiple mode oscillation. If the line width (spectra width) of the frequency components is broader, the problem of chromatic aberration is raised. Although it is attempted to excite the laser light in a sole wavelength using an injection seed technique, the oscillation spectral width becomes excessively narrow to produce inconveniences in utilization.

The laser light having high monochromaticity, that is with a narrow spectral width, has high coherence and is susceptible to noise produced by the interference pattern (speckle noise) caused by interference of the laser light itself with irregular phase relation with diffused light, such as stray light having different propagation distances. Conversely, the laser light with low monochromaticity, exhibits low coherence, however, it has a broad spectral width and is susceptible to chromatic aberration.

The laser light is used in, for example, a laser beacon device. This laser beacon device is investigated as means for improving resolution of an optical system employed in observation of heavenly bodies or in intersatellite light communication, as described in "Laser Beacon Adaptive Optics", Physics news, pp.14 to Jun. 19, 1993.

The laser beacon device radiates a laser light into air and emits light from sodium atoms in atmosphere by resonant absorption. The laser beacon device operates for detecting atmospheric disturbances by detecting the light emitted by the sodium atoms on the ground surface, while operating for correcting the atmospheric disturbances using an adaptive optical system for improving resolution of a telescope.

The sodium atoms emit light on resonant absorption of the laser light of a wavelength in the vicinity of 589 nm. For realizing high efficiency resonant excitation of sodium atoms, a high output laser light source, correctly coincident with the absorption spectrum of sodium atoms in both the frequency and frequency width, is required.

Figure 1:
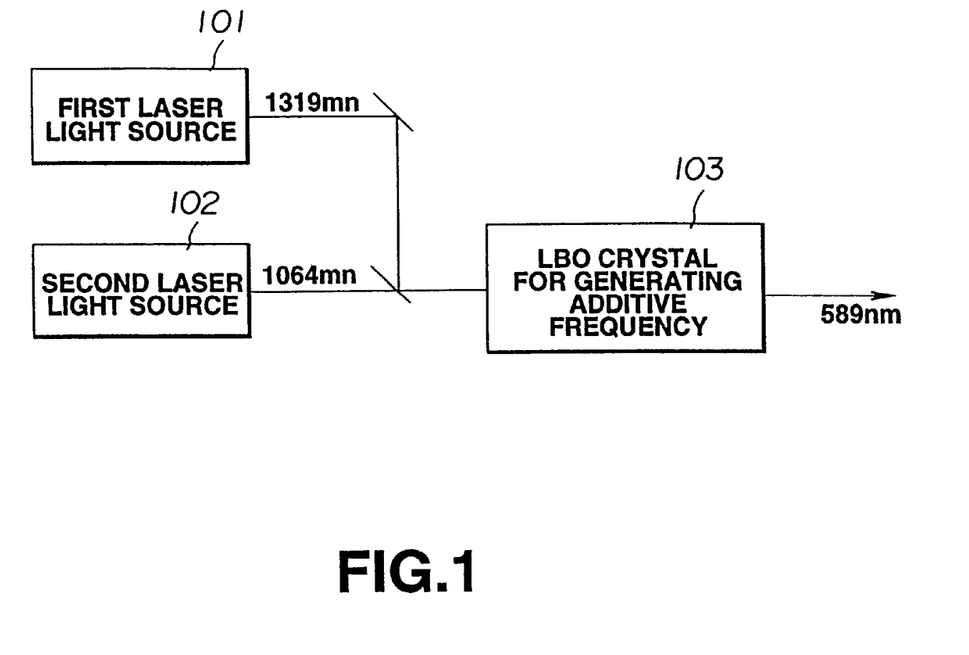
FIG. 1 shows the structure of a conventional laser light generating device.

As a high-output light source having a wavelength of 589 nm, there has so far been proposed a laser light source comprised of a first laser light source 101 having a Nd:YAGQ switch laser generating a fundamental wavelength laser light of a wavelength of 1319 nm narrowed in frequency using an injection seed technique, a second laser light source 102 having a Nd:YAGQ switch laser generating a fundamental wavelength laser light of a wavelength of 1064 nm similarly narrowed in frequency and an LBO crystal 103 for generating an additive frequency laser light from the fundamental wavelength laser light with the wavelength of 1319 nm and the fundamental wavelength laser light with the wavelength of 1064 nm.

The injection seed technique, used in the first laser light source 101 and in the second laser light source 102, excites the laser light by oscillation in a sole wavelength for correctly coinciding the wavelength of the laser light after additive frequency generation with the absorption wavelength of sodium atoms.

The absorption frequency width of sodium atoms, subjected to the Doppler effect, is on the order of 3 GHz. Since the laser light with the wavelength of 589 nm, obtained by a high output light source shown in FIG. 1, is narrowed in frequency by injection seed in each light source, the laser light obtained by the high output light source exhibits high frequency stability. The spectral width of the basic wavelength laser light, obtained by the high output laser light source, is narrowed up to approximately 25 MHz, which is the line width of a transform limited pulse, and which is only $\frac{1}{120}$ of the absorption frequency width of sodium atoms. Therefore, the resonance efficiency between the laser light and the sodium atoms is low.

The laser light is also applied to, for example, a laser image display device.

In the above laser image display device, if a laser light beam with a narrow spectral width is used, the speckle noise tends to be produced because of the high coherence of such laser light. Such speckle noise generates granular speckles in the laser image display device, thus significantly deteriorating the picture quality.

Thus, in the application of the laser light, it is crucial that the spectral width of the laser light be controlled to a moderate value for obviating problems produced in connection with chromatic aberration and speckled noise.

Several methods for broadening the spectral width of the laser light has so far been proposed. For example, it may be envisaged to oscillate the laser light in longitudinal multiple mode or to use the laser light oscillated in longitudinal multiple mode from the outset. In this case, the spectral width tends to be broadened excessively to raise the problem in connection with chromatic aberration. In addition, the structure of the laser light generating device itself needs to be changed, thus lowering the light emitting efficiency. That is, it has been difficult to increase the spectral width moderately to a desired value.

Furthermore, the laser light beam obtained on wavelength conversion on additive frequency mixing of two or more sorts of laser light beams oscillated in longitudinal multiple modes is unstable in intensity.

For removing the speckle noise, attempts have been made in improving the laser light projection system. For example, it has been proposed in JP Patent Kokai Publication JP-A-55-65940 (1980) that, in a laser image display device, a screen or a laser light source is oscillated mechanically. This, however, is infeasible if the screen size is larger.

Thus it is difficult to control the spectral width of the laser light to a desirable value to remove the speckled noise.

SUMMARY OF THE INVENTION

It is therefore an object of the present invention to provide a laser light generating device in which the spectral width of the laser light is broadened by addition of a simpler structure for deteriorating the coherence to a moderate value.

It is another object of the present invention to provide a laser beacon device and a laser image display device employing the above-mentioned laser light generating device.

According to the present invention, there is provided a laser beam generating device having a laser light source, phase modulation means for phase modulation of a laser beam radiated from the laser light source with a sole frequency component or a plurality of frequency components, and wavelength conversion means for converting the wavelength of the laser light phase-modulated by the phase modulation means into other wavelengths.

With the present laser beam generating device, the fundamental wavelength laser beam, generated by a laser light source, is phase-modulated by phase modulation means with a pre-set modulation amplitude and a pre-set modulation frequency so as to be enlarged in spectral width. The phase-modulated laser beam is then converted by wavelength conversion means into a laser beam of a shorter wavelength at the same time as it is further enlarged in spectral width. The result is that the coherence distance of the laser beam is shortened to suppress the speckle noise.

By carrying out phase modulation with plural frequencies, a laser beam having a continuous spectrum can be generated. With such laser beam, coherence is sufficiently reduced, while generation of the speckle noise is suppressed. The laser beam radiated from the wavelength conversion means has its coherence controlled by the modulation amplitude and the modulation frequency used in the phase modulation means.

With the above-described laser beam generating device of the present invention, it becomes possible to realize coherence required of the optical device to diminish the speckle noise by addition to the light source of an optical system of a simplified structure configured for controlling the modulation frequency and the modulation frequency at the time of phase-modulating the fundamental wavelength laser beam.

In addition, in carrying out phase modulation using plural modulation frequencies, it becomes possible to generate a continuous spectrum to further reduce the speckle noise.

Moreover, if phase modulation is performed prior to wavelength modulation, the electro-optical crystal can be prevented from being damaged by the laser beam since the laser beam incident on the electra-optical crystal is a near-infrared light.

DESCRIPTION OF THE PREFERRED EMBODIMENTS

Referring to the drawings, preferred embodiments of the laser light generating device according to the present invention will be explained in detail.

Figure 2:
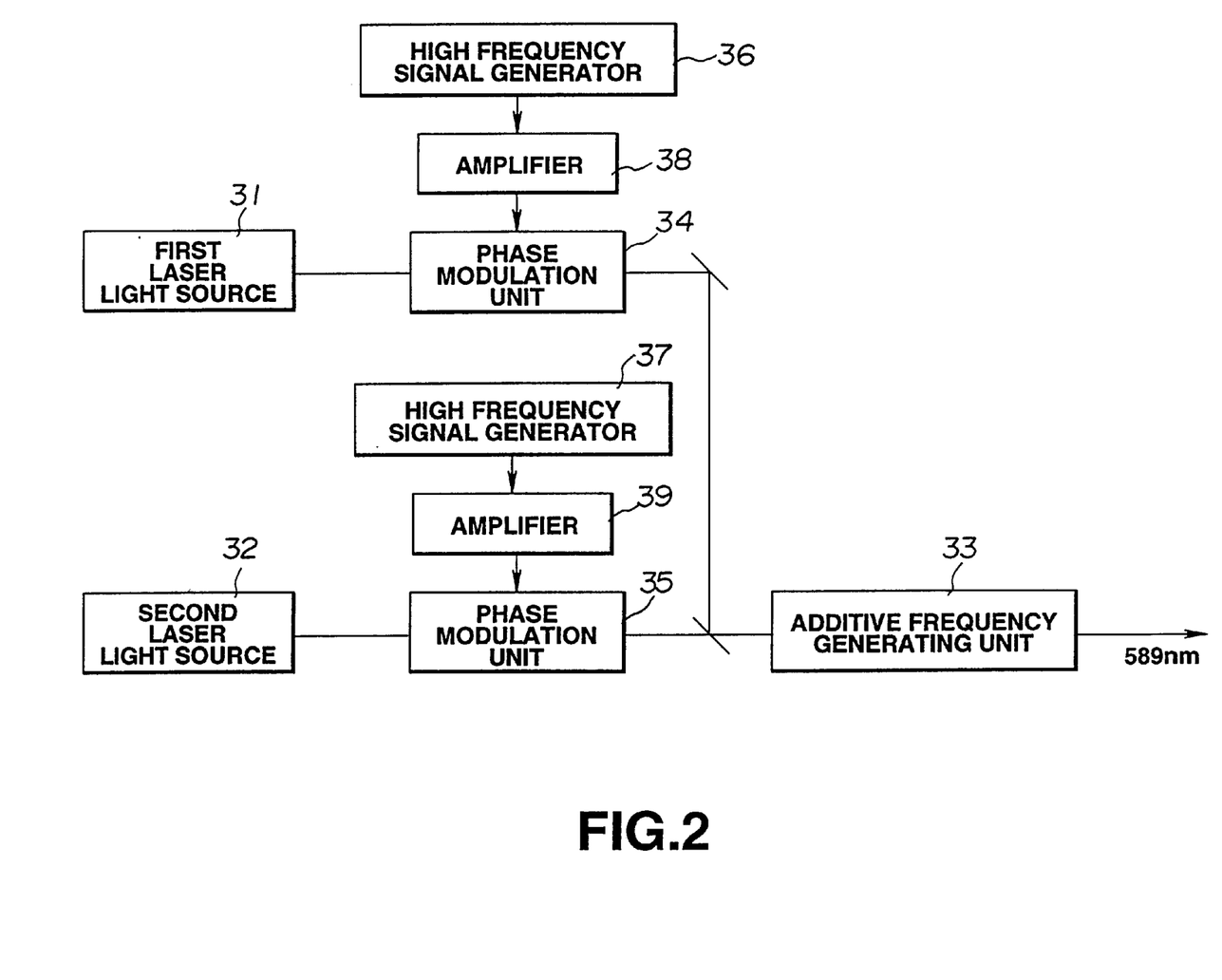
FIG. 2 shows an illustrative structure of a laser light generating device of the present invention used as a light source for a laser beacon device.

FIG. 2 shows a laser light generating device for generating the laser light of 589 nm used in, for example, a laser beacon device.

FIG. 2 shows a laser light generating device for generating the laser light of 589 nm used for example in a laser beacon device.

The laser light generating device is made up of light sources 31, 32 for generating fundamental wavelength laser beams, phase modulation units 34, 35 for phase modulating the fundamental wavelength laser light beams from the light sources 31, 32 with one or plural frequency components, and an additive frequency generating unit 33 for converting the wavelength of the light beams phase-modulated by the phase modulation units 34, 35 into other wavelengths.

Each of the phase modulation units 34, 35 has an electro-optical element, while the additive frequency generating unit 33 has a non-linear optical crystal element.

Referring to FIG. 2, the fundamental wavelength laser light beam of a wavelength of 1319 nm, radiated by the first laser light source 31, is incident on the phase modulation unit 34 for phase modulation. The fundamental wavelength laser light, with a wavelength of 1064 nm, radiated from the second laser light source, is incident on the phase modulation unit 35 for phase modulation. The fundamental wavelength laser light beam prior to wavelength conversion is phase-modulated by the phase modulation units 34, 35 with one or plural modulation frequencies so that the respective fundamental wavelength laser beams are increased in spectral widths. The phase-modulated basic wavelength laser light beams are incident on the additive frequency generating unit 33. The additive frequency generating unit 33 performs additive frequency mixing, that is wavelength conversion, using the fundamental wavelength laser light beams of 1319 nm and 1064 nm. The laser light of 589 nm, after the wavelength conversion, is increased in spectral width than the fundamental wavelength laser beams. The laser beam with the wavelength of 589 nm, obtained after additive frequency mixing or wavelength conversion, is sufficiently widened in the spectral width, so that the resonance efficiency can be improved if the laser beam is used for resonance excitation of sodium atoms.

The principle of phase modulation in the electro-optical element and changes in the power spectrum produced by phase modulation will now be explained.

Figure 3A:
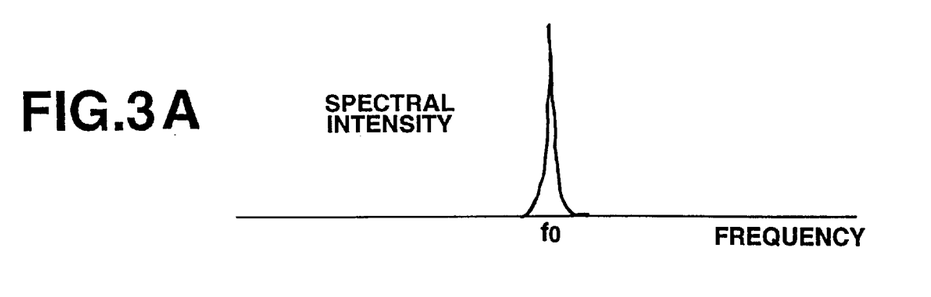
FIGS. 3A, 3B and 3C are graphs showing phase modulation performed by the laser generating device.

FIG. 3A shows the power spectrum in an initial stage of the fundamental wavelength laser beam.

If a signal voltage of a periodic function $\phi(t)$ is impressed across an electro-optical modulation device, provided with an electro-optical element, an electrical field $E(t)$ of the laser light undergoes phase modulation as indicated by the equation (1):

$$E(t) = E_0(t)\exp[i2\pi f_0 t + i\phi(t)] \qquad (1)$$

$$\phi(t) \; \phi(t) \qquad (2)$$

where $f(0)$ is the center frequency of the pre-modulation laser beam.

In the above equations, φ(t) is a phase modulation function and proportionate to the signal φ(t) impressed across the electro-optical modulation device. This is shown in the equation (2). In particular, if φ(t) is a sine wave having an amplitude m and a frequency fm as indicated by the equation (3), the electrical field E(t) may be expanded, using the Bessel function series Jk(m), as indicated by the equation (4):

$$\phi(t) = m\sin 2\pi f_m t \qquad (3)$$

$$\phi(t) = m\sin 2\pi f_m t \qquad (3)$$

$$E(t) = \sum_{k=-U}^{U} J_k(m) \exp[i2 * (f_o + kf_m)t]$$

Figure 3B:
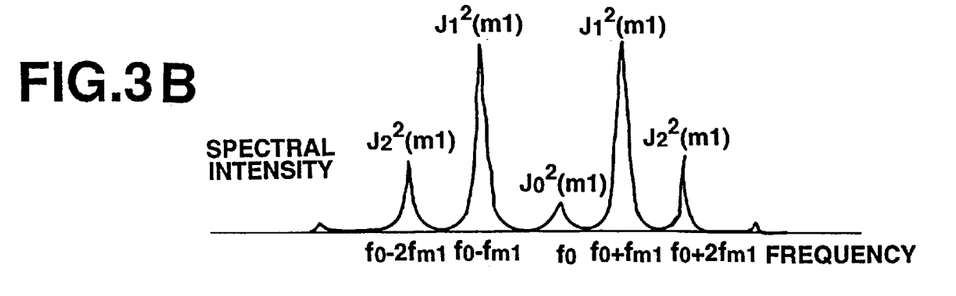

At this time, the power spectrum becomes the sum total of the spectral components of the intensities $J_k^2(m)$ and the frequencies (f0+kfm), where k is an integer, as indicated in FIG. 3B. The spectral intensity of the center frequency f0 is decreased by phase modulation and becomes equal to $\{J_0(m)\}^2$ times that prior to modulation.

If phase modulation is done a plural frequencies, the phase modulation function φ(t) is as indicated by the equation (5):

$$*(t) = \sum_j m_j \sin 2 * f_{mj} l \qquad (5)$$

such that phase modulation in each frequency operates additively and multiplicatively as to the frequency and intensity, respectively.

Figure 3C:
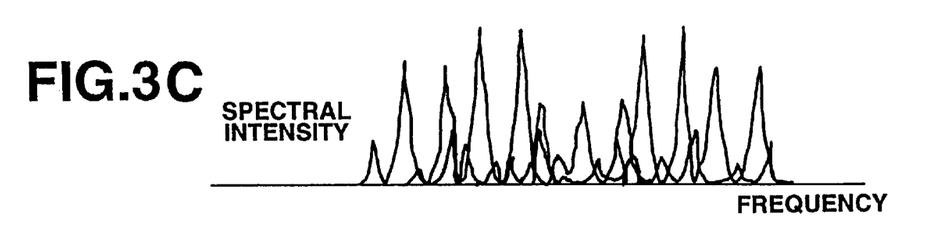

For example, a spectrum composed of the intensity $J_k^2$(m1) and the frequency (f0+kfm1), produced by phase modulation at a modulation amplitude m1 and the modulation frequency fm1, is slitted by phase modulation at another modulation frequency fm2 int spectral components having the intensities of $J_k^2(m1) \cdot J_k^2(m2)$ and the frequencies (f0+kfm1+lfm2), where k and l are integers, as indicated in FIG. 3C, and thus becomes an aggregate of a large number of spectra.

It may be seen that, by effecting a plurality of, for example, two, phase modulation operations at respective different modulation frequencies, the initial power spectrum may be separated into a large number of spectra, with the spectral distances becoming denser. The spectral intervals become smaller than the smallest one of the plural modulation frequencies. If the least common multiple of the modulation frequencies is a sufficiently large value, the number of the spectral components becomes substantially equal to (2m1+1)×(2m2+1).

If the first phase modulation is carried out with a high frequency voltage signal of a voltage amplitude such that the frequency is fm1=350 MHz and the phase modulation amplitude m1=2 radians (phase modulation function φ(t)) and the second phase modulation is carried out with a high frequency voltage signal of a voltage amplitude such that the frequency is fm2=100 MHz and the phase modulation amplitude m2=2 radians, the spectral interval becomes equal to 100 MHz, with the number of the spectral components becoming (2×2+1)×(2×2+1)=25.

In the phase modulation, described above, it is not the spectral line width of the fundamental wavelength laser light beam but the width of a larger number of the spectral components into which the fundamental wavelength laser light beam is slitted, that is broadened. The width of an envelope of the aggregate of the spectral components thus separated is defined herein as the entire spectral width. That is, the coherent length is shortened by the spreading apart of the entire spectrum, thus reducing the speckle noise.

Referring to FIG. 2, the first laser light source 31 is an Nd:YAGQ switch laser, narrowed in frequency from the laser beam having the wavelength of 1319 nm by injection seeding. On the other hand, the second laser light source 32 is an Nd:YAGQ switch laser, narrowed in frequency from the laser beam having the wavelength of 1064 nm by injection seeding.

High-frequency generating units 36, 37 generate, as high-frequency signals, a signal voltage of a periodic function φ(t) for obtaining the above-mentioned phase modulation function φ(t), such as a sine wave voltage signal composed of one or plural frequency components, by the phase modulation units 34, 35, respectively, and output the resulting high-frequency signals to amplifiers 38, 39, respectively. The amplifiers 38, 39 amplify the input high-frequency signals and output the resulting amplified high-frequency signal to the phase modulation units 34, 35, respectively.

Figure 4:
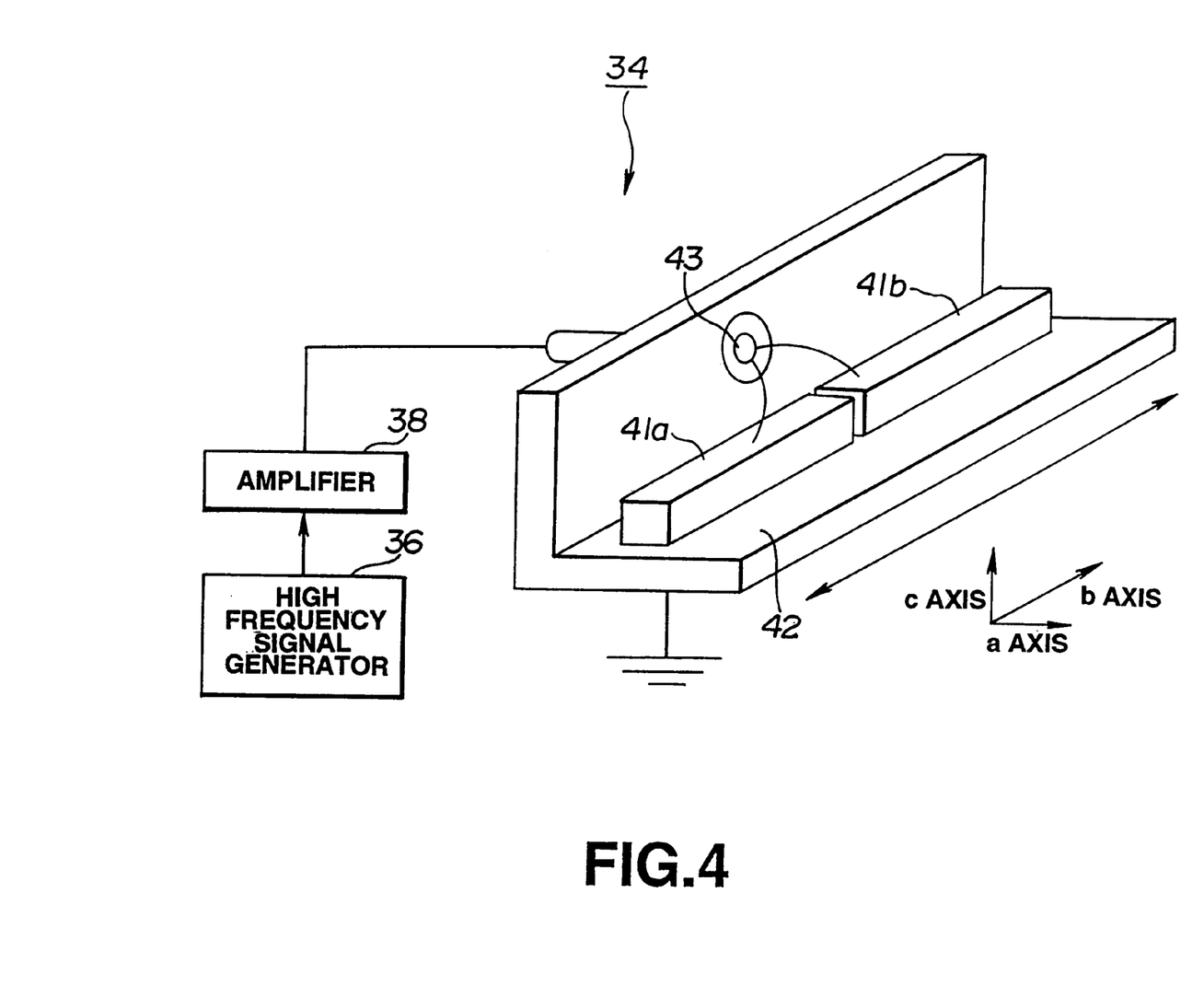
FIG. 4 shows an illustrative structure of a phase modulation unit in the laser modulation unit.

The phase modulation unit 34 is arranged as shown in FIG. 4, using plural titanium oxide potassium phosphate crystals (KTiOPO$_4$:KTP) as electro-optical crystals, as shown in FIG. 4. Two KTP crystals 41a, 41b are mounted on a mount 42. One of the electrodes of each of KTP crystals 41a, 41b is connected via a connector 43 to the amplifier 38, with the other electrode being grounded. This impresses the high-frequency voltage from the high-frequency signal generating unit 36 across the electrodes of the KTPs 41a, 41b.

The phase modulation unit 34 also phase-modulates the incident fundamental wavelength laser beam with the wavelength of 1319 nm with a phase modulation function obtained on the basis of the sine wave voltage signal from the high-frequency signal generating unit 36, and spreads the entire spectral width of the fundamental wavelength laser beam with the wavelength of 1319 nm to Δf1 (Δf1≈2×fm1×m1). That is, the electrical field E1(t) of the fundamental wavelength laser beam at this time is of a value represented by the equation (6):

$$E_1(t) = E_{01}(t)\exp[i2\pi f_1 t + im_1 \sin 2\pi f_{m1} t] \qquad (6)$$

Similarly, the phase modulation unit 35 also phase-modulates the incident fundamental wavelength laser beam with the wavelength of 1064 nm with a phase modulation function obtained on the basis of the sine wave voltage signal from the high-frequency signal generating unit 37, and spreads the entire spectral width of the fundamental wavelength laser beam with the wavelength of 1064 nm to Δf2 (Δf2≈2×fm2×m2). That is, the electrical field E2(t) of the fundamental wavelength laser beam at this time is of a value represented by the equation (7):

$$E_2(t) = E_{02}(t)\exp[i2\pi f_2 t + im_2 \sin 2\pi f_{m2} t] \qquad (7)$$

The additive frequency generating unit 33 has, for example, boron oxide lithium (LiB$_3$O$_5$:LBO) crystals, as non-linear optical crystal elements. The additive frequency generating unit 33 generates and radiates the laser beam having the wavelength of 589 nm in accordance with the principle of additive frequency generation, as later described, using the phase-modulated fundamental wavelength laser beams with the wavelengths of 1319 nm and 1064 nm. The entre spectral width Δf3 of the laser beam, wavelength-converted into the wavelength of 589 nm, is of the same order of magnitude as the sum of the entire spectral widths Δf1 and Δf2 of the respective fundamental wavelength laser beams prior to wavelength conversion, that is, $\Delta f_3 \Delta f_1 + \Delta f_2$. Since the allowable wavelength widths of the respective laser beams used for this wavelength conversion are of sufficient widths, the entire spectral width is increased, so that the wavelength conversion efficiency is not lowered. An electrical field $E_3(t)$ of the laser beam, obtained on wavelength conversion, is of a value represented by the equation (8):

$$\begin{aligned} E_3(t) &= E_1(t) \times E_2(t) \quad (8) \\ &= E_{01}(t) \cdot E_{02}(t) \exp[i2\pi(f_1 + f_2)t + \\ & \quad im_1 \sin 2\pi f_{m1} t + im_2 \sin 2\pi f_{m2} t] \\ &= E_{03}(t) \exp[i2\pi(f_1 + f_2)t + im_1 \sin 2\pi f_{m1}(t) + im_2 \sin 2\pi f_{m2} t] \end{aligned}$$

The principle of additive frequency generation is now explained. In a non-linear optical crystal element, non-linear polarization not proportionate to the magnitude of the external electrical field applied from outside is generated. If, of the nonlinear polarization, the non-linear second-order susceptibility is not zero, and two light beams with frequencies of $v1$, $v2$ are incident, a non-linear polarization with the frequency of $v3$, where $v3=v+v2$, is induced in the crystal. That is, if the laser beams with the wavelengths of $\lambda 1$ and $\lambda 2$ are incident, the wavelength $\lambda 3$ of the light, generated on frequency addition and radiated from the non-linear optical crystal, satisfies the following relation (9):

$$\frac{1}{\omega_3} = \frac{1}{\omega_1} + \frac{1}{\omega_2} \quad (9)$$

That is, the wavelength of the laser beam, produced by frequency addition of a laser beam with a wavelength of 1319 nm and a laser beam with a wavelength of 1064 nm, is $1/(1/1319+1/1064)=589$ nm.

It is assumed that phase modulation is carried out using a sine wave of a sole frequency component as a phase modulation function. If the fundamental wavelength laser beam with a wavelength of 1319 nm is phase-modulated, with $f_{m1}$ of 350 MHz and m1 of 2 radians, $\Delta f1$ becomes equal to $2 \times 350$ MHz$\times 2 = 1.4$ GHz. That is, the spectral width of the fundamental wavelength laser beam with the wavelength of 1319 nm in its entirety has been enlarged to approximately 1.4 GHz.

On the other hand, if the basic wavelength laser beam with a wavelength of 1064 nm is phase-modulated, with $f_{m2}$ of 350 MHz and m2 of 2 radians, $\Delta f2$ becomes equal to $2 \times 350$ MHz$\times 2 = 1.4$ GHz. That is, the spectral width of the fundamental wavelength laser beam with the wavelength of 1064 nm in its entirety has been enlarged to approximately 1.4 GHz.

The spectral width $\Delta f3$ of the laser beam obtained on frequency addition is the sum of $\Delta f1$ and $\Delta f2$, and hence becomes substantially equal to 1.4 GHz+1.4 GHz=2.8 GHz, thus substantially coinciding with the absorption line width of sodium atoms subjected to the Doppler effect, for thereby assuring efficient excitation of sodium atoms.

In the above laser light generating device, the fundamental wavelength laser beam prior to wavelength conversion is phase-modulated and subsequently the laser beam of the additive frequency is generated for additively demonstrating the respective phase modulation effects. It suffices if the spectral width of the laser beam prior to wavelength conversion is one-half the spectral width desired of the post-wavelength-conversion laser beam.

Meanwhile, if the phase conversion is carried out using a sole modulation frequency fm, the power spectrum is an aggregate of spectral components having frequency intervals equal to fm. Thus the frequency interval of the spectrum of the laser beam obtained on phase modulation of two laser beams of two different wavelengths using the modulation frequency of the same order of magnitude followed by additive frequency generation is on the order of fm.

In the above embodiment, no more than about eight spectral components are present within the spectral width of 2.8 GHz, with the spectral interval being 350 MHz. On the other hand, for exciting sodium atoms efficiently, it is desirable to generate a continuous spectrum with a spectral width on the order of 3 GHz.

For producing such spectrum by phase modulation, it is necessary to reduce the frequency interval to generate a large number of spectral components. On the other hand, since the spectral width of the laser beam radiated from the laser light source is on the order of 25 MHz, a continuous spectrum may be produced if the frequency interval is set to about 25 MHz. For realizing a continuous spectrum with a sole modulation frequency, the modulation frequency needs to be reduced to a smaller value of 25 MHz. For providing a spectral width of 2.8 GHz, it suffices if the modulation amplitude is set to about 28, the spectral width of the laser beam of each wavelength is set to $2 \times 28 \times 25$ MHz$\approx 1.4$ GHz and the spectral width is further doubled through the additive frequency generating process. However, such a larger modulation amplitude in effect cannot be achieved.

By carrying out plural phase modulation operations using lower modulation frequency components, it becomes possible to realize a spectrum of a smaller frequency interval than is possible with phase modulation by a sole frequency component. Specifically, each of the fundamental wavelength laser beams of two sorts of the wavelengths is phase-modulated with the modulation frequency of 350 MHz and the modulation amplitude of 2 radians. In addition, one or both of the fundamental wavelength laser beams prior to wavelength modulation is phase-modulated with the modulation frequency of 100 MHz and the modulation amplitude of 2 radians for separation into dense spectral components with the frequency interval of 100 MHz. Further, one or both of the fundamental wavelength laser beams prior to wavelength modulation is phase-modulated with the modulation frequency of 25 MHz and the modulation amplitude of 2 radians.

The spectrum of the laser beam resulting from the above-described phase modulation is an aggregate of a large number of spectral components with the frequency intervals of 25 MHz, thus achieving a substantially continuous spectrum. Thus, by phase modulation employing plural frequencies, it becomes possible to diminish the frequency interval without the necessity of increasing the modulation amplitude, as a result of which a continuous spectrum can be generated for improving the excitation efficiency of, for example, sodium atoms.

Among the methods for doing phase modulation using plural frequency components, there are a method consisting in arraying plural electro-optical crystals in series and impressing voltages of different frequencies across these crystals, and a method consisting in impressing signals of plural frequency components across a sole electro-optical crystal. In particular, with the former method, the driving voltage of the phase modulation unit can be lowered by arranging circuits that may be in electrical resonance at a frequency applied to each electro-optical crystal, as will be explained subsequently. With the latter method, the number of the electro-optical crystals can be reduced thus assuring a low production cost.

Such phase modulation at plural frequencies is effective in removing the speckle noise, as will be explained subsequently.

As the electro-optical crystals, use may be made of all electro-optical crystals capable of transmitting the near-infrared light, in addition to KTP. In particular, $MTiOXO_4$ (M=K, Rb, Tl, NH4, Cs, X=P, As), which is a derivative of KTP, exhibits superior electro-optical effects, and is less prone to damages otherwise caused by a higher output laser beam, so that it is effective as a high-output laser.

In the above illustrative embodiment, the fundamental wavelength laser beam having the wavelength of 1319 nm and the fundamental wavelength laser beam having the wavelength of 1064 nm can be combined together so that the two fundamental wavelength laser beams will be phase-modulated simultaneously by one and the same phase modulation unit. Although the modulation frequencies and modulation amplitudes of the phase modulation performed on the respective fundamental wavelength laser beams cannot be set independently, the spectral width can be effectively widened by selecting the suitable frequency and suitable modulation amplitude.

The favorable effect of the present invention can be achieved by employing the modulation frequency and the modulation amplitude other than those given in the present illustrative embodiment. While the absorption line width of sodium atoms, subjected to the Doppler effect, is as broad as 3 GHz, the frequency width of the frequency-stabilized generic solid Q-switch laser is as small as tens of MHz. The resonance excitation efficiency can be sufficiently improved by increasing the frequency width of the laser beam to approximately 500 MHz instead of to as high as 3 GHz. Although a continuous shape of the spectrum is desirable, the excitation efficiency can be improved sufficiently by employing a laser beam made up of four or more spectral components each having a spectral intensity not higher than 30% of the sum of the entire spectral intensity.

Figure 5:
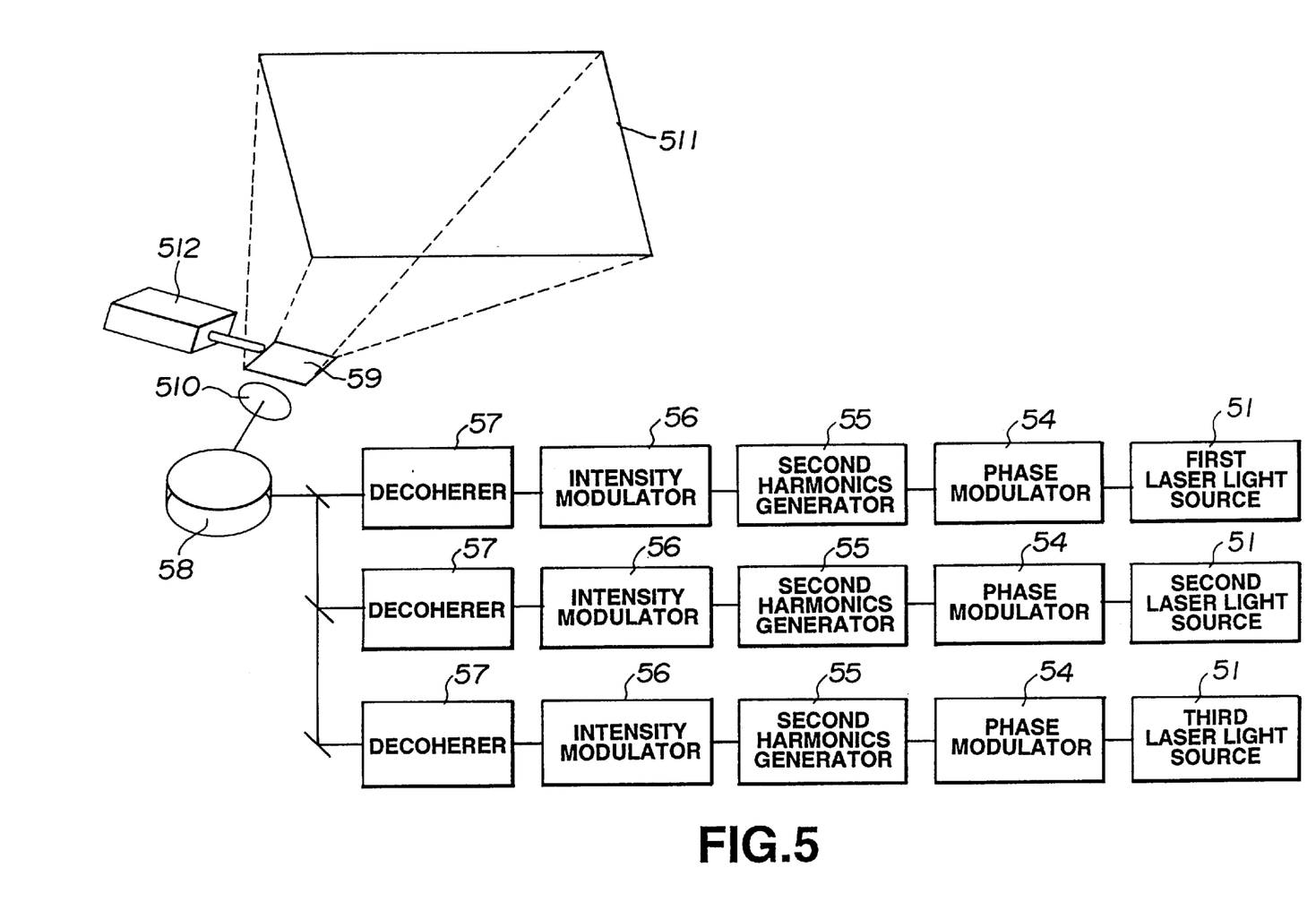
FIG. 5 shows an illustrative structure of the laser light generating device used as a light source for the laser image display device.

FIG. 5 shows an illustrative configuration of a laser beam generating device of the present invention as applied to a laser image display device.

In general, an image display device is in need of light sources of three colors, namely red, green and blue colors. Thus the above laser image display device employs, as a light source, a first laser light source 51 having a Nd:YAGQ switch laser generating a laser beam with a wavelength of 1319 nm, a second laser light source 52 having a Nd:YAGQ switch laser generating a laser beam with a wavelength of 1064 nm and a third laser light source 53 having a Nd:YAGQ switch laser generating a laser beam with a wavelength of 946 nm. Specifically, the second harmonics of the basic wavelength laser beam, radiated by the first laser light source 51, is the red-hued laser beam, while the second harmonics of the basic wavelength laser beam, radiated by the second laser light source 52, is the green-hued laser beam, and the second harmonics of the basic wavelength laser beam, radiated by the third laser light source 53, is the blue-hued laser beam.

The fundamental wavelength laser beams, radiated by the respective laser light sources, are phase-modulated with a sole frequency or plural frequencies by phase modulation units 54, and wavelength-converted by second harmonics generating units 55 to form second harmonics for widening the spectral width. That is, temporal coherence is lowered. The generated second harmonics are then modulated by image signals by an intensity modulation unit 56. Subsequently, the lowering in temporal coherence is converted into that in spatial coherence for reducing the speckle noise in the laser beam. In general, a screen 511 is moved for reducing the speckle noise. This, however, is unnecessary with the present embodiment.

The phase modulation unit 54 is provided independently for each of the laser light sources, and includes an electro-optical crystal, such as KTP. The phase modulation unit 54 phase-modulates the incident basic wavelength laser beam by a pre-set modulation frequency and a pre-set modulation amplitude, impressed from outside, for widening the spectral width, as described previously. Any optional coherence may be achieved by suitably selecting the modulation frequency and the modulation amplitude.

Similarly to the phase modulation unit 54, the second harmonics generating unit 55 is provided independently for each laser light source, and includes a non-linear optical crystal, such as LBO or BBO. The second harmonics generation unit converts the phase-converted fundamental wavelength laser beam into second harmonics, that is halves the wavelength of the fundamental wavelength laser beam. If the spectral width of the fundamental wavelength laser beam is enlarged by phase modulation to, for example, 500 MHz, the spectral width of the laser light subsequent to wavelength conversion is twice that of the fundamental wave, or 1 GHz, with the coherent length being on the order of 0.2 nm.

A decoherer 57, provided independently for each laser light source, splits the laser light, affords the optical path length difference of not less than the coherent length to the split laser beams and subsequently synthesizes the split laser beams.

A polygonal mirror 58 is a rotating member having a series of planar reflective surfaces on its peripheral surface, and constitutes, along with a galvanomirror 59 as later explained, a deflection optical system for sweeping the light from the respective laser light sources on a screen 511. The polygonal mirror 58 also reflects the laser light outgoing from the decoherers 57 and combined together in order to cause the reflected laser light to fall on the galvanomirror 59 via a projection lens 510.

The galvanomirror 59 is supported for rotation by the galvanomotor 512 and is rotated at an elevated speed in association with the laser light sequentially sent in association with the rotation of the polygonal mirror 58 for reflecting and projecting the incident laser light on the screen 511.

For reducing the speckle noise, it is necessary for the coherence of the laser beam to become sufficiently small in the presence of an optical path length difference not less than the coherent length. To this end, it is desirable that the spectrum of the post-wavelength-conversion laser light beam be made up of not less than at least four spectral lines each having non-negligible intensity and that the spectral intensity of each spectral component be not more than 30% of the entire spectral intensity, as now explained.

If the spectrum of the laser beam subsequent to wavelength conversion is split by phase modulation, but the number of spectral components is not less than, for example, three, or if the spectral intensity of one of the spectral components is as large as not less than 30% of the entire spectral intensity, the spectral intensity is concentrated in a particular frequency, so that the laser light cannot be said to be of multiple modes, such that coherence cannot be decreased sufficiently. This is not favorable in view of decoherer designing.

Conversely, if the spectral intensity of each spectral component is not more than 30% of the entire spectral intensity, and there exist four or more spectral components, the spectrum of the laser beam is split into a larger number of spectral components with good equilibrium, so that coherence is effectively decreased. The length at which coherence is again increased is relatively spaced apart as compared to the coherent length. This is favorable for the designing of decoherers.

Figure 6:
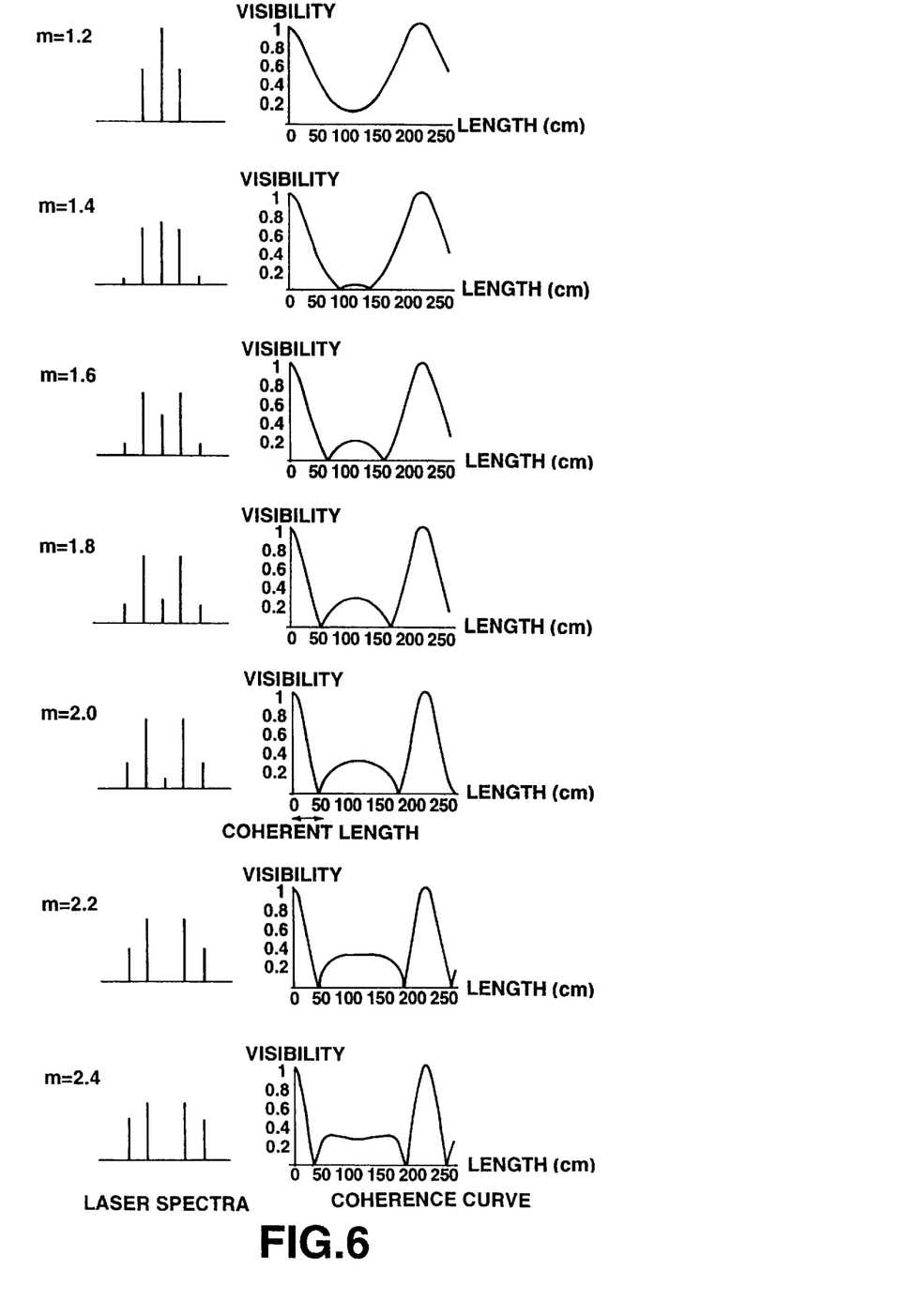
FIG. 6 shows laser light spectra and coherence curves.

Reference is had to FIG. 6 showing the spectrum of the laser light and coherence curves in case the laser beam is phase-modulated with a high-frequency voltage signal of a certain frequency to a longitudinal single mode laser. The phase modulation amplitude m is varied in a range of from 1.2<m<2.4. If the phase modulation is performed with a sole frequency and with a smaller modulation amplitude, as in the present embodiment, coherence becomes zero at a certain optical path length difference (coherent length), however, it is again increased with increased optical path length difference. The reason is that, since the interval between the spectral components is equal, coherence of the neighboring spectral components becomes strongly apparent.

In particular, if the modulation amplitude is small, such that m=1.2 to 1.4, coherence again becomes maximum for the optical path length difference of the order of 2.5 times the coherent length. In the case of m=1.4, coherence again becomes maximum for the optical path length difference of 200 cm for the coherent length of 80 cm. With a light source in which coherence again becomes maximum for the optical path length difference as small as about 2.5 times the coherent length, it is difficult to remove the speckle noise using a decoherer.

If the modulation amplitude m is such that m=1.6 or higher, the spectrum is made up of four or more spectral components of non-negligible intensities, with the intensities of the respective spectral components being not higher than 30% of the entire spectral intensity. In the present embodiment, the optical path length difference for which coherence again becomes maximum is not less than thrice the coherent length. It should be noted that, if m=1.6, coherence again becomes maximum with the optical path length of 200 nm for the coherent length of 60 cm. If the optical path length difference for which coherence again becomes maximum is sufficiently long as compared to the coherent length, the speckle noise can be removed sufficiently by suitably designing the decoherers. The coherence again becoming maximum for the optical path length difference about three times as long as the coherent length cannot be said to be sufficient, however, it is effective to display the effect of removal of the speckle noise.

The entire spectral width of the laser beam wavelength-converted after phase modulation is desirably not less than 500 MHz. The reason is that, in view of decoherer designing, the decoherer size tends to become excessive for too long a coherent length. If the spectral width is 500 MHz or higher, the coherent length is on the order of 0.4 m, so that the decoherer can be designed with a practical size.

Figure 7A:
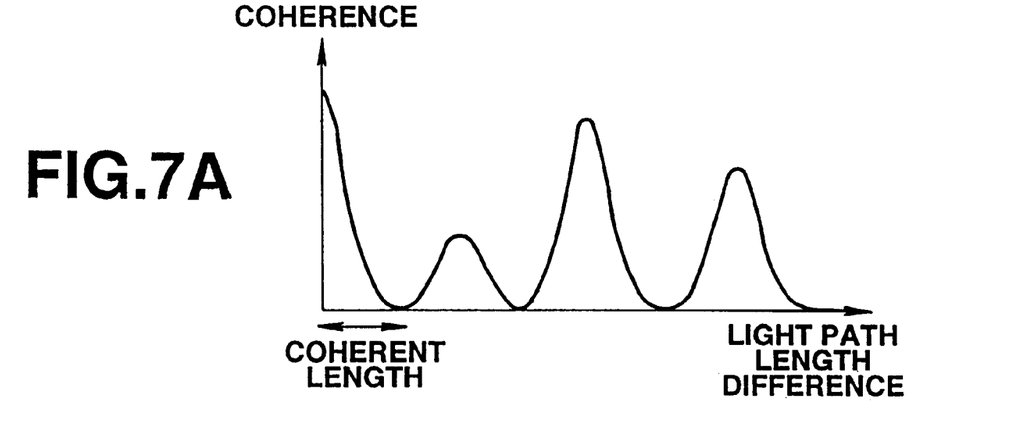
FIGS. 7A and 7B are graphs showing coherence in a length exceeding the coherent length of a laser light beam phase-modulated by the phase modulation unit.
Figure 7B:
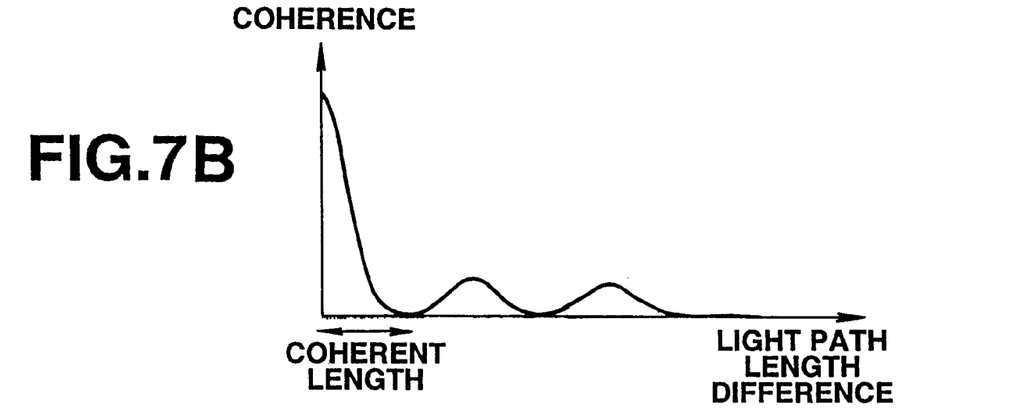

If phase modulation is performed with plural frequencies, more outstanding results can be achieved. If phase modulation is performed with a sole frequency, there necessarily exists such an optical path length difference for which coherence again is increased for an optical path length difference longer than the coherent length, since the frequency interval of each spectral component of the laser beam is equal. This state is shown in FIG. 7A. Conversely, if the phase modulation is performed with plural frequencies, the intervals between the spectral components are not the same, so that coherence is not increased again with the optical path length difference exceeding the coherent length. This state, shown in FIG. 7B, is favorable in removing the speckle noise.

Although an embodiment of the present invention applied to a laser image display device has been described above, the laser beam is not limited to the above-described embodiments, but may be modified in many ways.

For example, although the embodiment has been described above in which the Q-switch laser is used as a light source and an Nd:YAG as a solid laser device is used as an illustrative example of the Q-switch laser, a gas laser, such as krypton gas laser, or a semiconductor laser, such as a laser diode, may be used as a red light source.

Although the spectral width is enlarged in the above embodiment by exploiting the waveform conversion process, it is also possible to directly perform phase modulation on the light source subsequent to the waveform conversion. The low coherence and reduction of the speckle noise, characteristic of the present invention, may also be achieved in the case of the laser light source not having the waveform conversion process.

If the krypton gas laser or the laser gas diode is used as the red-hued light source, and waveform conversion is not performed, the laser light from the light source is shorter in wavelength than the near-infrared laser light, significant modulation effects may be realized at a low voltage at the time of phase modulation.

Although the laser beams from the three light sources of red, green and blue colors are phase-modulated independently of one another, it is also possible to combine the three laser beams together and to perform phase modulation on the combined laser beam by a sole phase modulation unit for three colors simultaneously. In this case, the laser beam after phase modulation is separated by a color separation filter before being incident on a second harmonics generating unit as a wavelength conversion unit.

Since the spectral width can be controlled by controlling the modulation amplitude or modulation frequency at the time of phase modulation, it becomes possible to realize the laser light beam of which the speckle noise and the chromatic aberration have reached the practical level.

Although the present invention is applied to an illustrative embodiment in which the laser light emitting device is used as a light source for the laser beacon device and the laser image display device, it may also be used as a light source for other optical devices.

In addition, although a light source oscillating with a longitudinal single mode is used as a light source for the fundamental wavelength laser light subjected to phase modulation, it is also possible to use a laser light source of the longitudinal multiple mode. For example, if a Nd:YAGQ switch laser is oscillated in multiple modes with the frequency interval on the order of 400 MHz, this laser beam may be phase-modulated with the modulation frequency not higher than 400 MHz, such as 100 MHz, for approaching the power spectrum of the laser light to as close to a continuous spectrum as possible for diminishing the coherency sufficiently.

Moreover, although the laser light source oscillated with a Q-switch oscillation is used as a light source of the fundamental wavelength laser light to be phase-modulated, a continuously oscillated laser light source may also be employed. In this case, the post-wavelength-conversion laser light is phase-modulated since if the resonant frequency of a resonator inclusive of a non-linear optical crystal is coincident with the frequency of the fundamental wavelength laser light beam, wavelength conversion is performed with a high conversion efficiency, whereas, if the spectrum is enlarged before wavelength conversion, the wavelength conversion efficiency is lowered significantly.

Figure 8:
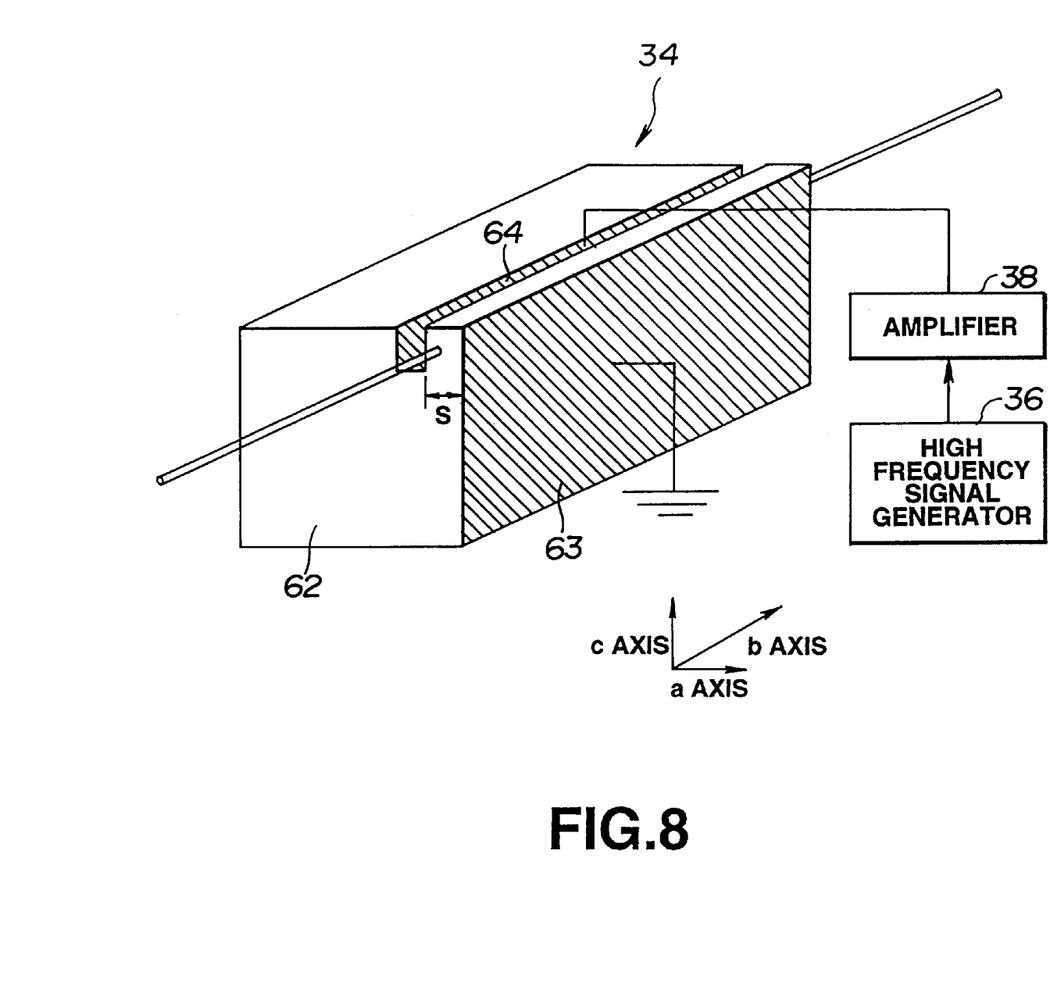
FIG. 8 shows a second illustrative structure of a phase modulation unit in the laser modulation unit.

An illustrative structure of the phase modulation unit, in which two KTPs are arrayed in series in the longitudinal direction, as shown in FIG. 4, it is possible to use such a structure in which a KTP 62 which is 30 mm long along the lengthwise direction and 2 mm long along other directions is used, an electrode 63 is formed on a lateral side thereof, a groove electrode 64 is formed at a distance of, for example, 0.5 mm inwardly from the electrode 63 at a distance s from the electrode 63, with the electrode-to-electrode distance being s, with the electrode 63 being grounded and the groove electrode 64 being connected to the amplifier 38, as shown in FIG. 8. In such case, the laser light beam to be phase-modulated is caused to be incident to an area between the two electrodes. By this structure, the input voltage to the KTP 62 from the high frequency signal generator 36 may be diminished. The phase modulation unit shown in FIG. 8 is particularly effective if no damage is done to the crystal due to the laser beam even if the input laser beam is sufficiently reduced in beam diameter.

Figure 9:
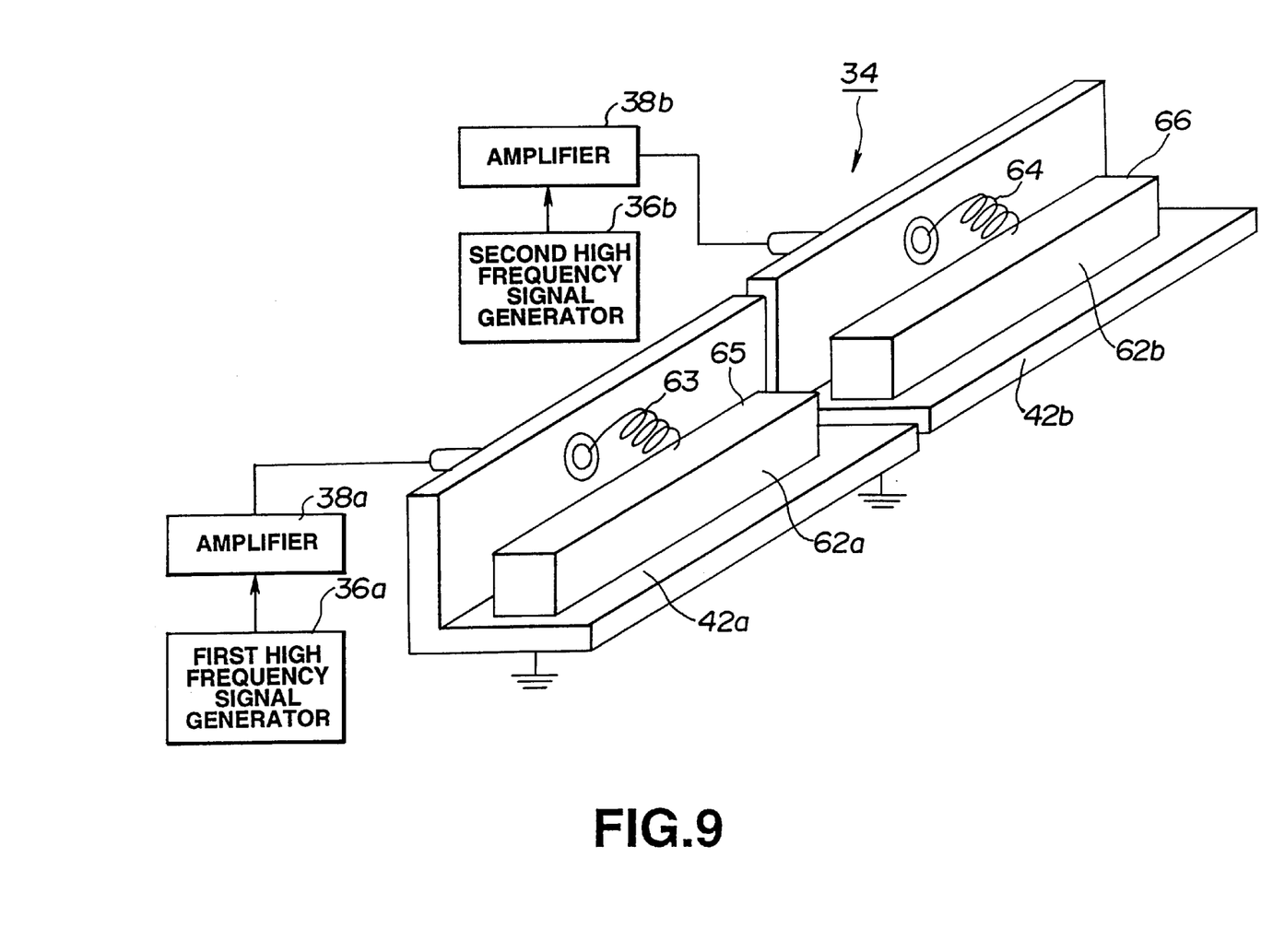
FIG. 9 shows a third illustrative structure of a phase modulation unit in the laser modulation unit.

Another structure of reducing the input voltage to the KTP is shown in FIG. 9, in which two KTPs 62a, 62b are arranged in series in the lengthwise direction on distinct mounts 42a, 42b, respectively, an electrode 65 is provided on a surface of the KTP 62a opposite to the surface thereof facing the mount 42a, and in which a coil 63 is connected between the electrode 65 and an amplifier 38a.

If, with the electrical capacitance of the electro-optical crystal being $C_{xtal}$ and with the inductance of a coil having its end connected to an electrode arranged on the electra-optical crystal being L, a high-frequency signal of the frequency fr is supplied to the opposite end of the coil, the electro-optical crystal and the coil constitute an electrical resonation system as represented by the equation (10):

$$f_r = \frac{1}{2*} * \frac{1}{\sqrt{L * C_{xtal}}} \quad (10)$$

To each phase modulation unit, a signal of a single frequency may be impressed by the first high frequency signal generating unit 36a or the second high frequency signal generating unit 36b for setting the coil inductance for enabling electrical resonation responsive to each frequency in accordance with the equation (10) across the KTPs 62a, 62b for impressing the voltage on the order of one-tenth for achieving modulation amplitude of the equivalent size. As the electro-optical crystal, those having a low dielectric loss, that is high electrical resistance, such as dihydrogen potassium phosphate ($KH_2PO_4$), dihydrogen ammonium phosphate ($NH_4H_2PO_4$), β-barium borate (β-$BaB_2O_4$, β-BBO), rubidium titanate arsenate ($RbTiOAsO_4$), cesium titanate arsenate ($CsTiOAsO_{14}$), lithium niobate ($LiNoO_3$) or lithium tantalate ($LiTaO_3$), may be effectively employed.

If, with a view to enlarging the spectral width with a high frequency and a small modulation amplitude, phase modulation is to be performed with a signal of a higher frequency, such as 400 MHz or higher, the phase modulation unit may be configured so that an electro-optical crystal will be arranged within the inside of a microwave waveguide. In such case, a smaller impressed voltage suffices if the microwave waveguide is oscillated in resonation at the time of impressing an electrical voltage across the electro-optical element.

It is also possible to provide a pair of mirrors on both sides of the electro-optical crystal, in which case the laser light beam incident on the crystal is caused to travel repeatedly through the inside of the crystal for protracting the length along which phase modulation occurs for reducing the required voltage. Meanwhile, this mirror may be provided on the outside of the crystal. Alternatively, a high reflective film may be deposited on the crystal surface on a portion of which is formed a low reflectance film. Still alternatively, the phenomenon of total reflection, generated by adjusting the incident angle, may also be utilized.

I claim:

1. A method of generating laser light comprising the steps of:

generating a first laser light with a laser light source;

modulating the first laser light with a phase modulation means having high frequency signal generating means and an electro-optical crystal, said high frequency signal generating means generating and outputting high frequency electrical signals having a sole frequency component or plural frequency components, said phase modulation means causing a laser beam radiated by said laser light source to be transmitted through said electro-optical crystal, to which said high frequency electrical signals are impressed, for phase-modulating said laser light; and converting a wavelength of a resultant laser light with conversion means having a non-linear optical crystal, said wavelength conversion means causing the laser light phase-modulated by said phase modulation means to be transmitted through said nonlinear optical crystal for converting the wavelength of said laser beam, wherein said laser light source is a Q-switch laser having a solid laser element.

2. The method of generating laser light of claim 1, wherein the step of generating laser light with the laser light source comprises a step of continuously oscillating a laser light source.

3. The method of generating laser light of claim 2, wherein the step of generating laser light comprises oscillating a laser light at a longitudinal single mode.

4. The method of generating laser light of claim 2, wherein the step of generating laser light comprises oscillating a laser light at a longitudinal multiple mode.

5. The method of generating laser light of claim 1, wherein said electro-optical crystal is comprised at least of potassium phosphate titanate, potassium phosphate titanate derivatives, β-barium borate, lithium borate, lithium tantalate, dihydrogen potassium phosphate and dihydrogen ammonium phosphate.

6. The method of generating laser light of claim 1, wherein said phase modulation means is comprised of plural phase modulation units operating at respective different frequencies.

7. The method of generating laser light of claim 1, wherein said phase modulation means has a coil and an electro-optical crystal and wherein a resonance system formed by said coil and the electro-optical crystal has an operation of amplifying a driving voltage impressed across the electro-optical crystal.

8. The method of generating laser light of claim 1, wherein said phase modulation means has a microwave waveguide and an electro-optical crystal and wherein a microwave resonance system formed by arraying the electro-optical crystal in said micro-wave waveguide has the action of amplifying the driving voltage impressed across said electro-optical crystal.

9. The method of generating laser light of claim 1, wherein said phase modulation means is configured so that the input fundamental wavelength laser beam is repeatedly transmitted a plural number of times through the electro-optical crystal.

10. The method of generating laser light of claim 1, wherein said phase modulation means has a groove formed on the surface of the electro-optical crystal along an axis of transmission of the laser beam to be modulated and wherein one of the electrodes is formed on an internal surface of said groove.

* * * * *